(12) United States Patent  (10) Patent No.: US 9,317,116 B2
Ullrich et al.  (45) Date of Patent: Apr. 19, 2016

(54) SYSTEMS AND METHODS FOR HAPTICALLY-ENHANCED TEXT INTERFACES

(75) Inventors: Chris Ullrich, Ventura, CA (US); David Birnbaum, Oakland, CA (US); Craig Vachon, El Dorado Hills, CA (US); Jason Fleming, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 1536 days.

(21) Appl. No.: 12/556,411

(22) Filed: Sep. 9, 2009

(65) Prior Publication Data

US 2011/0061017 A1 Mar. 10, 2011

(51) Int. Cl.
*G06F 3/01* (2006.01)
*G06F 3/023* (2006.01)
*G06F 17/27* (2006.01)

(52) U.S. Cl.
CPC .............. *G06F 3/016* (2013.01); *G06F 3/0237* (2013.01); *G06F 17/276* (2013.01)

(58) Field of Classification Search
CPC ....................................................... G06F 3/016
USPC ......................................... 715/780, 816, 702
See application file for complete search history.

(56) References Cited

U.S. PATENT DOCUMENTS

| 5,818,437 | A | 10/1998 | Grover et al. |
| 6,011,554 | A | 1/2000 | King et al. |
| 6,286,064 | B1 | 9/2001 | King et al. |
| 6,307,549 | B1 | 10/2001 | King et al. |
| 7,403,888 | B1* | 7/2008 | Wang ...................... G06F 3/018 704/2 |

(Continued)

FOREIGN PATENT DOCUMENTS

| CN | 1195409 | 10/1998 |
| CN | 1678978 | 10/2005 |

(Continued)

OTHER PUBLICATIONS

Patent Cooperation Treaty, International Search Report and Written Opinion, Application No. PCT/US2010/047127, mailed May 4, 2011.

(Continued)

*Primary Examiner* — Daeho Song
(74) *Attorney, Agent, or Firm* — Kilpatrick Townsend & Stockton LLP

(57) ABSTRACT

When units of serialized input are analyzed by an engine or algorithm that provides a plurality of entry suggestions for competing or replacing a unit of the serialized input, one or more haptic effects can be identified and provided in conjunction with display, selection, or use of one or more of the entry suggestions to aid in the use of the engine or algorithm. The haptic effects can represent a confidence level with respect to one or more of the entry suggestions or may otherwise indicate the relative success of the engine/algorithm. For example, the serialized input may comprise characters input to a mobile or other device. The engine or algorithm may suggest words or phrases with varying degrees of confidence, with the confidence with respect to some or all of the suggestions communicated by use of haptic effects. Additional embodiments include dynamic text input interfaces, haptically-enhanced serial presentation of content, and interfaces that provide haptic effects at a first device based on remote text entry, display, reading, or other activity at a different device.

23 Claims, 9 Drawing Sheets

(56) References Cited

U.S. PATENT DOCUMENTS

| | | | |
|---|---|---|---|
| 7,453,439 | B1 | 11/2008 | Kushler et al. |
| 7,479,949 | B2 * | 1/2009 | Jobs ..................... G06F 3/0488 345/169 |
| 2003/0007018 | A1 * | 1/2003 | Seni ..................... G06F 3/0237 715/864 |
| 2005/0190970 | A1 | 9/2005 | Griffin |
| 2005/0193338 | A1 | 9/2005 | Hawkins et al. |
| 2006/0143342 | A1 * | 6/2006 | Kim ........................ G06F 3/016 710/73 |
| 2007/0216659 | A1 | 9/2007 | Amineh |
| 2007/0229476 | A1 * | 10/2007 | Huh .................... G06F 3/04886 345/173 |
| 2007/0279392 | A1 * | 12/2007 | Rosenberg .............. A63F 13/10 345/173 |
| 2008/0218490 | A1 | 9/2008 | Kim et al. |
| 2008/0227065 | A1 * | 9/2008 | Hamway .................. G09B 5/14 434/236 |
| 2008/0300055 | A1 * | 12/2008 | Lutnick ............... G07F 17/3209 463/39 |
| 2009/0066722 | A1 | 3/2009 | Kriger et al. |
| 2009/0328105 | A1 * | 12/2009 | Craner .............. G06F 17/30997 725/46 |
| 2010/0049525 | A1 * | 2/2010 | Paden ..................... G10L 15/26 704/270.1 |

FOREIGN PATENT DOCUMENTS

| | | |
|---|---|---|
| CN | 1771748 | 5/2006 |
| CN | 101008864 | 8/2007 |
| CN | 101387936 | 3/2009 |
| CN | 102576255 | 7/2012 |
| EP | 1 256 871 | 11/2002 |
| EP | 1 921 836 | 5/2008 |
| EP | 1 936 929 | 6/2008 |
| GB | 2 348 082 | 9/2000 |
| GB | 2 376 610 | 12/2002 |
| JP | 2005 092441 | 4/2005 |
| JP | 2007-133884 | 5/2007 |
| JP | 2008-242735 | 10/2008 |
| JP | 2009-181305 | 8/2009 |
| JP | 5789608 | 10/2015 |
| WO | WO 02/091160 | 11/2002 |
| WO | WO 2004/079557 | 9/2004 |
| WO | WO 2004/114700 | 12/2004 |
| WO | WO 2005/036310 | 4/2005 |
| WO | WO 2006/026165 | 3/2006 |
| WO | WO 2006/034952 | 4/2006 |
| WO | WO 2006/036853 | 4/2006 |
| WO | WO 2007/035827 | 3/2007 |
| WO | WO 2008/086319 | 7/2008 |
| WO | WO 2009/022657 | 2/2009 |

OTHER PUBLICATIONS

The State Intellectual Property Office of the Peoples Republic of China, Notification of the First Office Action, Application No. 201080040184, dated Mar. 6, 2014.
Japanese Patent Office, Office Action, Application No. 2012-528818, dated May 20, 2014.
The State Intellectual Property Off ice of the Peoples Republic of China, Second Office Action, Application No. CN201080040184.4, dated Aug. 20, 2014, 12 pages.
The State Intellectual Property Off ice of the Peoples Republic of China, Third Office Action, Application No. CN201080040184.4, dated Jan. 21, 2015, 13 pages.
The State Intellectual Property Off ice of the Peoples Republic of China, Decision on Rejection, Application No. CN201080040184.4, dated Aug. 19, 2015, 16 pages.
Japanese Patent Office, Final Notice of Reasons for Rejection, Japanese Patent Application No. JP2012-528818, dated Mar. 24, 2015, 2 pages.

* cited by examiner

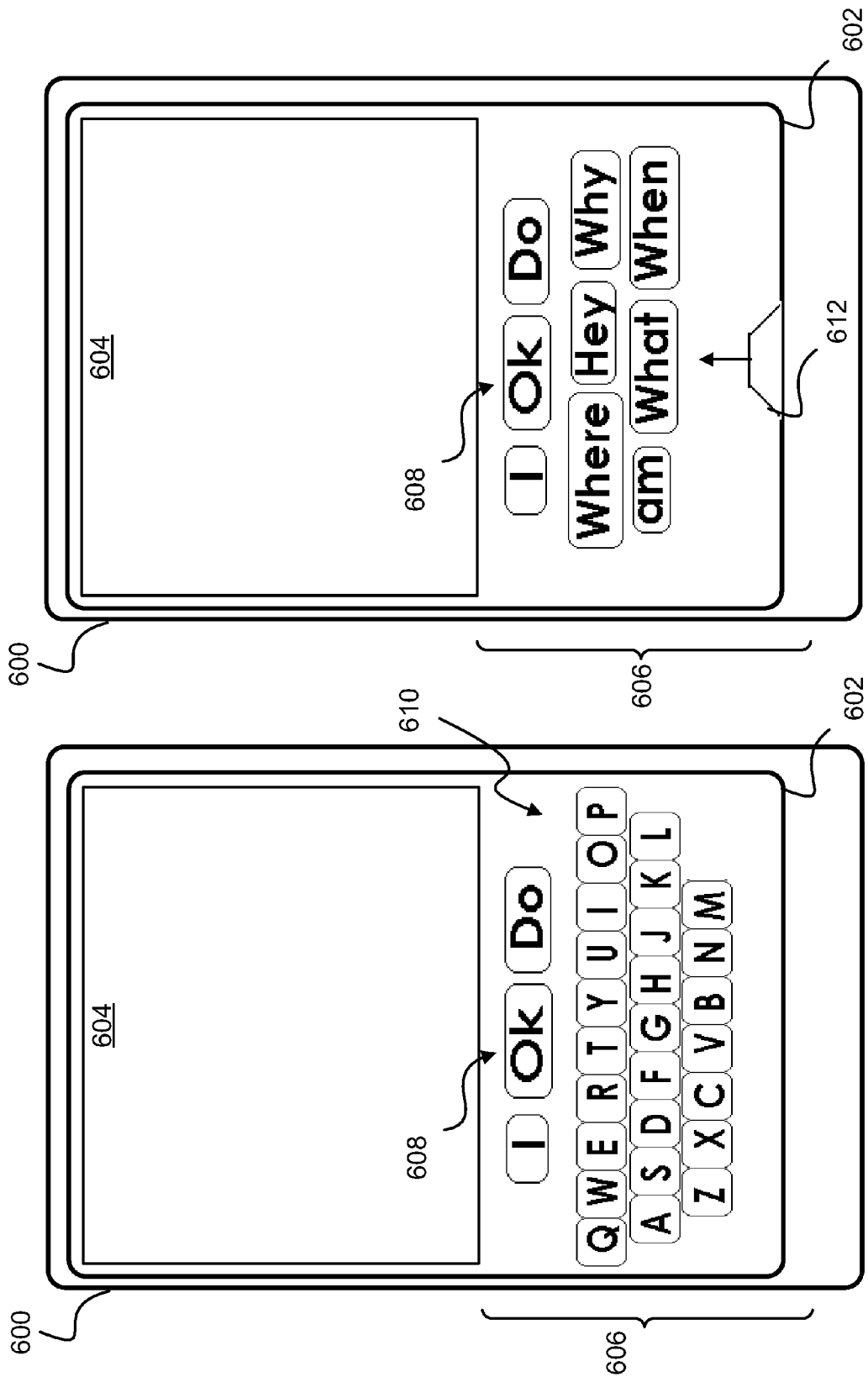

SYSTEMS AND METHODS FOR HAPTICALLY-ENHANCED TEXT INTERFACES

BACKGROUND

Communications options for mobile (and other) devices are often directed to making users more efficient while messaging. As an example, predictive text technologies such as T9 enable users to increase their text entry speed in words per minute (WPM). Based on serialized input, such as input received using keys each mapped to one or more letters, groups of letters can be used to suggest words corresponding to the input. The words that are suggested may be based on frequency of use and/or a dictionary and may be provided as selections in a menu or simply inserted to complete the user's input. The words or phrases that are suggested can be selected from numerous candidates based on a confidence indicator, such as a probability of a correct match based on usage statistics tracked by the text engine. Some predictive text technologies also support spelling suggestions, punctuation, and other enhancements.

SUMMARY

Embodiments of the present invention include methods and systems for providing haptically-enhanced user interfaces. Embodiments configured in accordance with one or more aspects of the present invention can result in a more compelling user experience, such as by enhancing user experiences in creating, sending, reading, and/or receiving content in a text interface.

Some embodiments of the present invention provide systems and methods for haptic feedback for text completion. In one embodiment, units of serialized input can be analyzed by an engine or algorithm that provides a plurality of entry suggestions for competing or replacing a unit of the serialized input. One or more haptic effects can be identified and provided in conjunction with display, selection, or use of one or more of the entry suggestions to aid in the use of the engine or algorithm. The haptic effects can represent a confidence level with respect to one or more of the entry suggestions or may otherwise indicate the relative success of the engine/algorithm.

For instance, in one embodiment, the serialized input can comprise input data representing a series of characters received at a computing device or mobile phone, with the units of serialized data comprising words or phrases. A method can comprise generating a text entry suggestion such as a word or phrase based on the received input data and determining a confidence level associated with the text entry suggestion by using a predictive text engine. The method can further comprise identifying a haptic effect from a plurality of potential haptic effects based at least in part on a confidence level (or other indicator) identified by the text engine and outputting at least one haptic signal configured to cause an actuator to generate the identified haptic effect.

In one embodiment, a system can comprise a processor, the processor having access to a computer-readable medium embodying program components, and an actuator. The program components can comprise a user interface module configured to receive input data, a text engine configured to generate a text entry suggestion and confidence level based on the received input, and a haptic effect module. The input data may represent one or more characters, phrases, and/or words. The haptic effect module can be configured to identify a haptic effect from a plurality of potential haptic effects based at least in part on the confidence level and to output at least one haptic signal configured to cause the actuator to generate the identified haptic effect. In some embodiments, the haptic effect module and user interface module are configured so that the haptic effect corresponding to each text entry suggestion is provided in conjunction with display or selection of the text entry suggestion. The text entry suggestion may comprise a suggestion completing partial entry of text, a suggestion to replace entered text, and/or suggestion of an entire word or phrase.

A device may include an interface providing selection mechanisms for selecting amongst text inputs comprising characters, words/phrases, or both. For instance, embodiments of the present invention include a dynamic key or text input interface. An on-screen keyboard may be hidden and then partially or fully restored to view in response to selection of a restore control. If a touch-enabled display is used, a user may touch the restore control and pull the keyboard into view, for example.

A device providing the dynamic key or text input interface can keep the keyboard in view until a discontinuity in selection occurs—for instance, if a touch-enabled display is used, the keyboard can be kept in view until contact with the display is broken. When the discontinuity occurs, the last key that was reached can be used as an input value and the keyboard can be automatically re-hidden. The dynamic key or text input interface may be used to augment haptic effects provided based on confidence levels associated with suggested words. Additionally or alternatively, haptic effects may be tied to selection of keys and/or movement of the keyboard.

The dynamic key or text input interface can include interface elements such as buttons to allow for selecting text inputs comprising entire words or phrases. The keyboard can be accessed when needed to select individual characters and hidden when not needed to reduce the screen space occupied and/or to make room for additional whole-word buttons.

Further embodiments of the present invention include providing an option for a user to select serialized display of incoming content. Selection may be indicated by physics-based input, such as shaking or tapping a device. When serialized display is used, serialized data can be divided into a plurality of units such as words, characters, punctuation marks, and the like that are displayed in sequence. Haptic effects can be provided before, after, and/or while units are displayed. Additional embodiments of the present invention provide for haptic effects at a first device based on activity at a second device. The activity can comprise input of words, characters, or other units of serialized data and/or may comprise display/viewing of words, characters, or other units of the data.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIGS. 6A-6D are each a diagram showing an illustrative dynamic key or text input interface in operation.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

Illustrative Example of Haptic Feedback for Text Completion

One illustrative embodiment of the present invention comprises a mobile device, such as a mobile phone, music player, or smart phone. In the illustrative embodiment, the mobile device comprises a Nokia 5800 featuring the T9 text completion engine. The mobile device can comprise a screen and a plurality of keys; the keys may comprise physical buttons or may be touchscreen based. A processor of the mobile device receives input from a user, the input comprising one or more key inputs for a field, such as a text field in a message. Based on the input, the processor can utilize the text completion engine to determine one or more candidates for completing the input. The candidate(s) can be associated with a confidence level.

Based on the confidence level, haptic output can be provided. For example, a haptic effect such as vibration of the phone may be provided in conjunction with a selection mechanism for allowing the user to choose a completion candidate. The haptic effect may change based on the confidence level of each selected suggestion and/or may be selected based on an overall confidence level for the available candidates. As another example, the haptic effect may be provided after the completion candidate with the highest probability is automatically inserted into the message or field to provide the user an opportunity to re-evaluate the insertion. Confidence levels may be measured for candidates relative to one another or relative to an absolute scale.

This illustrative example is given to introduce the reader to the general subject matter discussed herein. The invention is not limited to this example. The following sections describe various additional non-limiting embodiments and examples of methods and systems for use of haptic feedback in text completion.

Illustrative Systems for Haptic Feedback for Text Entry

Figure 1:
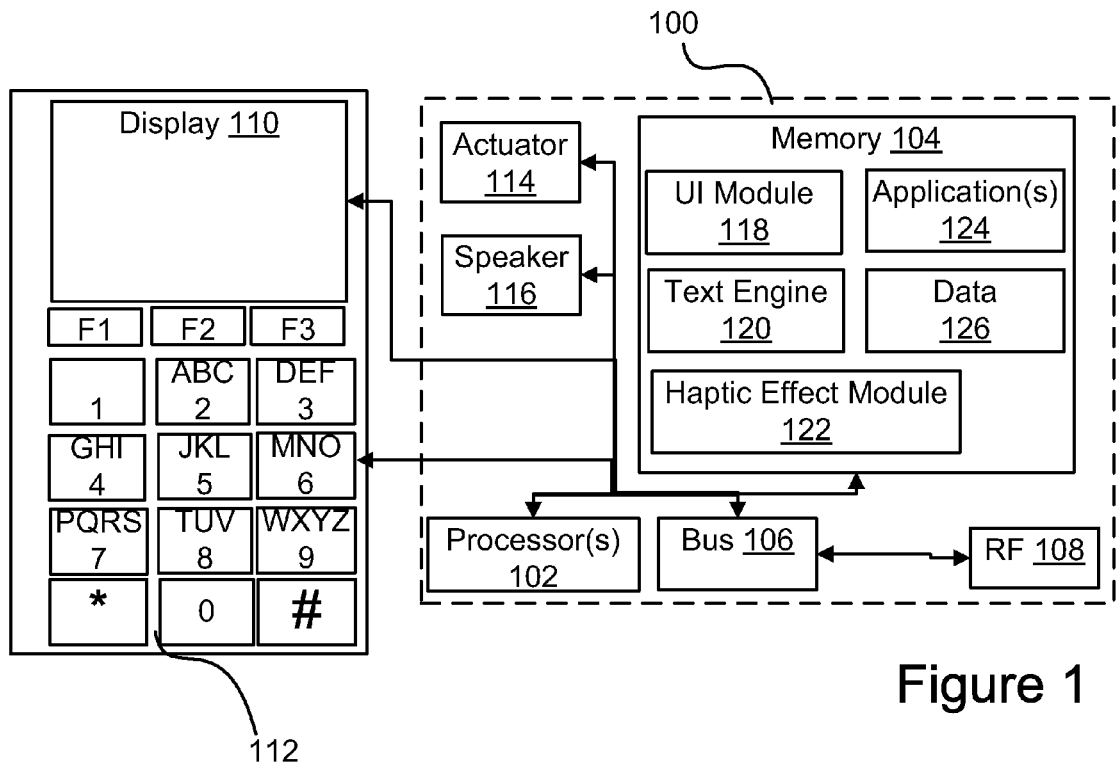
FIG. 1 illustrates an illustrative computing device comprising a mobile device configured to provide haptic effects with text entry suggestions.

FIG. 1 depicts an illustrative computer system 100 comprising a processor 102 with access via bus 106 to a computer-readable medium 104 embodying program components. System 100 also comprises an actuator 114. In this example, processor 102, medium 104, and actuator 114 are comprised in a mobile telephone including display 110, keypad 112, and speaker/microphone components 116. For instance, keypad 112 can comprise a 12-key keypad plus three function keys F1, F2, and F3 as illustrated. In some embodiments, a computer system can comprise a touch-enabled display and may or may not comprise separate keys for receiving input. Additionally, although actuator 114 is illustrated as included in computer system 100, an actuator 114 could be included in a peripheral device in communication with processor 102 (e.g., a Bluetooth headset).

In this example, computer-readable medium (memory) 104 comprises several program components that configure the computing system to provide functionality in accordance with one or more aspects of the present invention. Particularly, user interface module 118 is configured to receive input data representing selection of one or more characters, words, or phrases, a text engine 120 is configured to generate a text entry suggestion based on the received input data and determine a confidence level associated with the text entry suggestion, and a haptic effect module 122 configured to identify a haptic effect from a plurality of potential haptic effects based at least in part on the confidence level.

Memory 104 also includes one or more applications 124, such as an e-mail application, browser, address book application, messaging application, operating system, or any other executable code utilized by the computing device. Data 126 is representative of user data, application data, and other stored information used in operation of the computing system. Although data and applications are illustrated as hosted at the mobile device, embodiments can include remotely-hosted applications, program components, and/or data.

An application, such as one or more of applications 124, may provide an option for a user to provide one or more input values. For example, a user may enter text comprising content and/or an address for an email, message, or web page. Text engine 120 can comprise any number or type of algorithm-based predictive text engines that analyze that input and provide one or more text entry suggestions for the input value based on the user's input. For example, probabilistic algorithms can be used by text engine 120 to provide one or more suggested completions for an input value based on partially-provided input values. As another example, a user may input a complete value and text engine 120 may provide one or more suggested corrections for the input value. The user input and text entry suggestions may comprise one or more words or phrases and may include punctuation, numbers, and other characters as appropriate.

One or more of applications 124 can also include program components for handling network connections and one or more modules configured to access serialized data. For instance, an application may provide for receipt and review of data comprising messages sent via email, short message system (SMS), instant messaging, or another protocol during a communications session. As another example, one or more modules can access and decode stored data representing HTML content, word processor documents, and/or other electronic documents for display, such as for use in a browser, productivity application, or another application.

As will be noted below, content output by applications 124 may be enhanced through the use of one or more haptic effects handled by haptic effect module 122; these effects may be in addition to or instead of haptic effects based on text entry suggestions. Additionally. UI module 118 can be used to enhance delivery of content output by applications 124, such as by providing a serialized output mode discussed below. UI module 118 can also coordinate the receipt of input via keypad 112, a touch enabled display, and/or other input mechanisms.

In some embodiments, text engine 120 provides one or more suggested completions or entries based on previously-completed or entered words. As an example, a completion suggestion and/or a suggestion of a word for entry may be based on evaluating the sentence structure and/or subject matter context of the previous entry or entries. More generally, a text engine 120 can include any application or component that suggests one or more words, characters, or phrases for entry based on previously-provided input.

Text engine 120 may provide text entry suggestions based on a confidence level associated with one or more candidate suggestions to determine the one or more most likely corrections or completions to suggest and/or a presentation scheme for suggesting the text entries. The user may be presented an option to select from one or more candidate text entry suggestions and/or text engine 120 may insert the completion/correction with the highest confidence level for confirmation by a user. If the completion/correction is inserted, the text engine may simply assume the inserted completion/connection is desired unless other input is provided.

For example, while or after a user enters a series of characters, an interface may be provided to display one or more text entry suggestions, with the suggestion with the highest confidence level pre-selected. In some embodiments, the number and order of text entry suggestions may change as the confidence levels change while a user continues to type. If a user keys a "space" or another predetermined stop character without changing the selected text entry suggestion, then the selected text entry suggestion may be inserted by default.

Examples of predictive text engines include the T9 text engine available from Nuance Communications of Burlington, Mass., the iTap technology available from Motorola, Inc. of Libertyville, Ill., and the SureType engine available from Research in Motion, Inc., of Waterloo, Ontario, Canada. Additional examples of predictive text engines include PriText from Keisense of Hartford, Conn. and TouchType Express, information available online at http://www-.touchtype-online.com.

As was noted above, in accordance with one or more aspects of the present subject matter, haptic effects can be added to text entry suggestions to enhance the user experience. A haptic effect can be selected based on the confidence level associated with one or more text entry suggestions, which can allow a user to more easily or quickly determine the confidence level associated with the suggestion than would otherwise be possible. For instance, rather than stopping text entry and looking down at a display, the user may be able to simply scroll through various suggested completions in order to determine which is the most likely match.

The haptic effect may also be used as a cue to indicate whether a single suggestion has been made, whether multiple suggestions are available, and may simultaneously indicate the confidence level of the text engine with regard to the available suggestion(s). For example, an input interface may be presented with the highest confidence text entry suggestion relative to other potential suggestions highlighted. If the highest-confidence text entry suggestion has a low confidence level on an absolute scale, then different haptic feedback may be provided in order to attract the user's attention and to avoid the user inadvertently using a poorly-suggested completion/correction by default.

Haptic effect module 122 can be used to provide one or more haptic effects by providing at least one haptic signal configured to cause actuator 114 to generate the haptic effect. In this example, a single actuator 114 is illustrated, but multiple actuators could be used together and/or separately to provide various haptic effects. Examples of actuators include, but are not limited to, a piezoelectric actuator, an electric motor, an electromagnetic actuator, a voice coil, a linear resonant actuator, a shape memory alloy, an electro-active polymer, a solenoid, an eccentric rotating mass motor (ERM) or a linear resonant actuator (LRA). Actuators may be included in the device housing, in the device screen, and/or elsewhere.

In some embodiments, haptic effects are selected based on data mapping different effects to different confidence levels. For example, in some embodiments the confidence level comprises a probability value between 0 and 1 and the haptic effect module is configured to use a function correlating probability values to different haptic effects. As an example, the magnitude of the actuating signal can be used to adjust the amplitude of the vibration based on the probability value. As another example, the haptic effect may be based on the number of potential text input suggestions. The confidence levels indicate relative confidence between entry suggestions for a particular set of suggestions and/or may indicate confidence for entry suggestions relative to an absolute scale.

Haptic effects can be varied in any suitable manner. For example, amplitude and frequency of vibration can be adjusted to create a range of possible responses. As an example, a series of high-frequency, sharp pulses may be used in some instances while a low frequency continuous pulse may be used in other instances. The different types of haptic effects can be mapped to different confidence levels in some implementations. For example, high frequency and "sharp" output may be associated with low confidence levels in order to attract a user's attention, while lower frequency and other "subtle" output may be associated with high confidence levels. As another example, different types of haptic effects may be mapped to different categories of suggestions—for instance, different haptic effects may be used to indicate when a completion is suggested, when a substitution is suggested, and/or to differentiate between suggestion of an entire word or suggestion of punctuation.

In some embodiments, haptic effect module 122 relies on user settings, such as selection of haptic themes, to map confidence levels and other criteria to haptic effects. As an example, one theme may associate short, sharp effects with high-confidence suggestion of entire words while another theme may associate long, soft effects with the same type of suggestions.

Haptic effects may be stored and retrieved in any suitable manner. For example, data representing one or more signals for generating the haptic effects may be stored in a data store and then accessed based on an identifier or on attributes of the haptic effect. Additionally or alternatively, a haptic effect may be created using a stored effect and adjusting the amplitude, frequency, etc. based on the type of effect needed.

Figure 2:
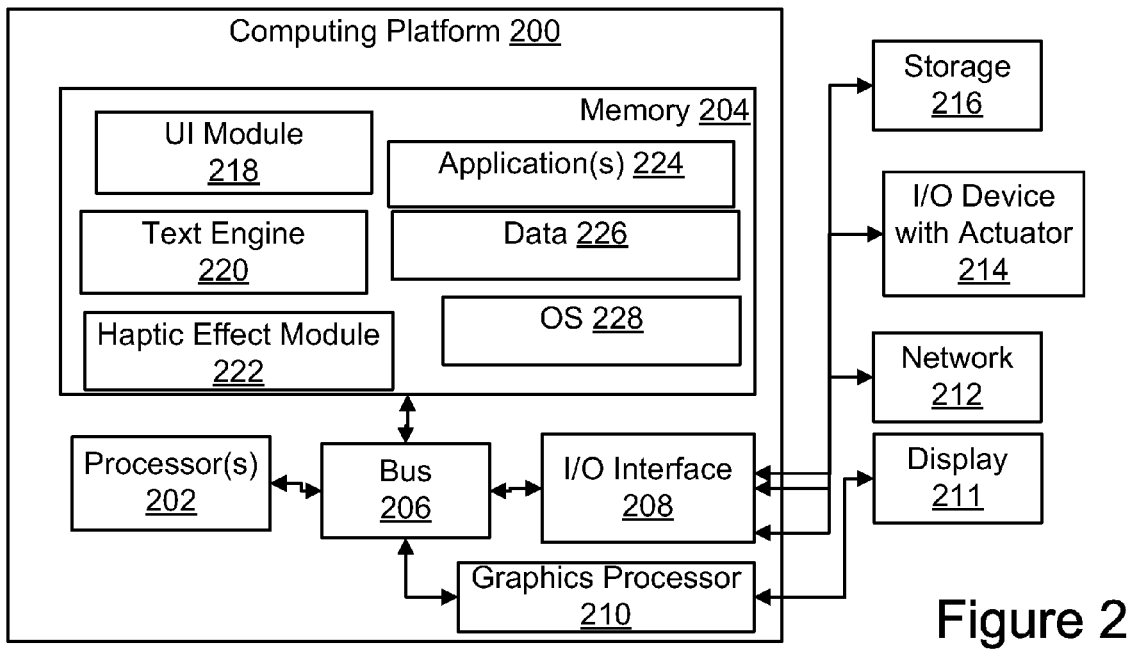
FIG. 2 illustrates an illustrative computing device configured to provide haptic effects with text entry suggestions.

FIG. 2 is a block diagram showing another embodiment in which haptic effects are provided in a computing system comprising computing platform 200. For example, computing platform 200 may comprise a portable or desktop computer. In this example, computing platform 200 comprises one or more processors 200, memory 204, bus 206, I/O interface 208, and graphics processor 210. I/O interface 208 and graphics processor 210 connect processor 202 to display 211, network 212, I/O devices 214, and storage 216 (e.g., hard disk, CD-ROM, and the like).

In this example, memory embodies UI module 218, text engine 220, and haptic effect module 222, which may be configured in accordance with UI module 118, engine 120, and haptic effect module 122. This example also illustrates one or more applications 224, data 226, and an operating system 228.

As mentioned above, one or more I/O devices 214 can be interfaced to computing platform 200. Examples of I/O devices include, but are not limited to, a mouse, keyboard, trackpad, joystick, game controller, touch enabled display, or a pen/touch tablet. Some or all such I/O devices or other devices in communication with processor 202 can comprise one or more actuators for providing haptic feedback. For example, haptic effects can be provided via a keyboard and/or mouse as a user types in a word processing application, web browser, e-mail application, operating system, interactive game, or other application.

In the examples above, UI module 118 (218), text engine 120 (220), and haptic effect module 122 (222) are shown separate from one another and from applications/operating systems. However, in some embodiments, functionality of the haptic effect module and/or UI module can be integrated into the text engine, one or more applications, and/or an operating system.

Illustrative Methods for Haptic Feedback for Text Completion

Figure 3:
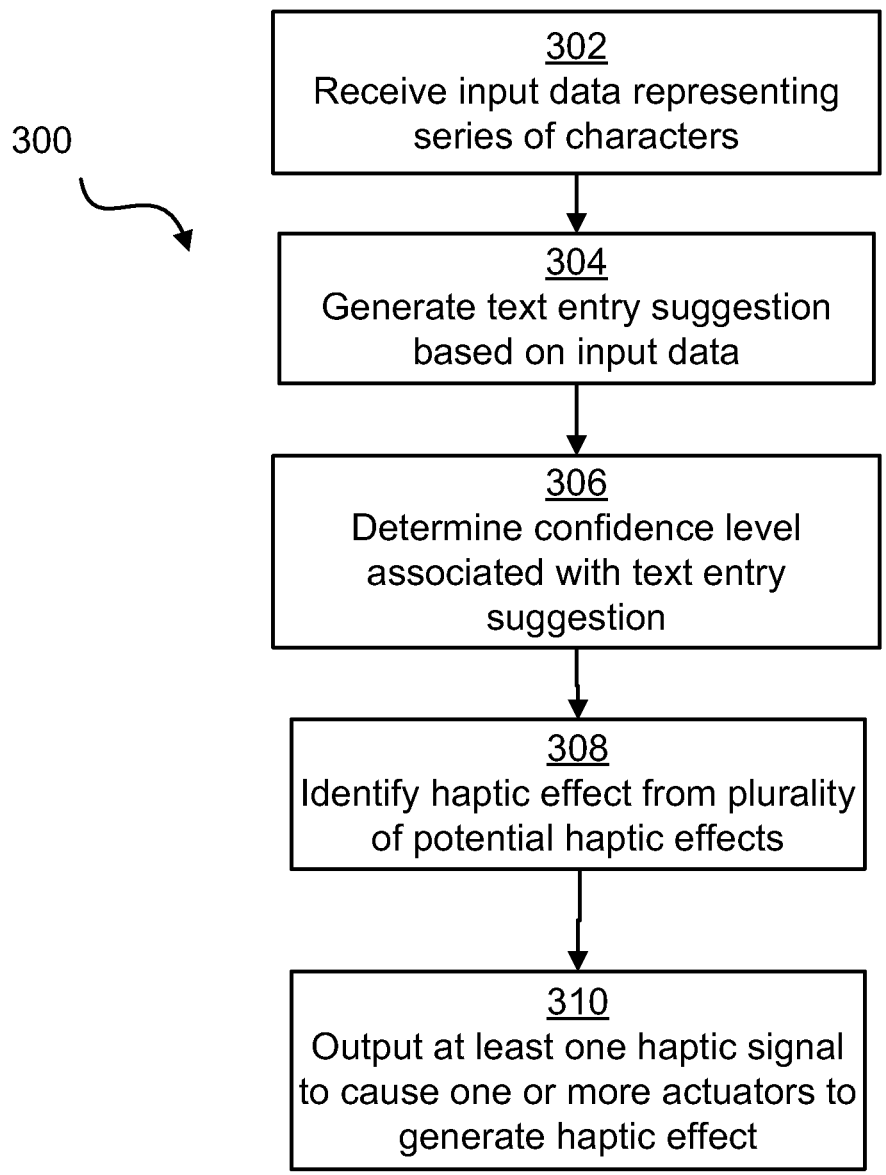
FIG. 3 is a flowchart showing illustrative steps in a method for providing haptic effects based on a confidence level associated with one or more text entry suggestions.

FIG. 3 is a flowchart showing illustrative steps in a method 300 for providing haptic effects based on a confidence level associated with one or more text entry suggestions. Block 302 represents receiving input data representing selection of one or more words or characters. For example, a user may input one or more characters and/or select words for entry via multitap keys on a mobile device, via a keyboard, or using another suitable input mechanism. As another example, a user may provide handwritten or touch input that is recognized as one or more letters or words.

Block 304 represents ascertaining a text entry suggestion based on the input data. In this example, ascertaining the text entry suggestion comprises generating the suggestion at the device. For instance, a text engine may utilize existing technology to determine intended an intended word based on the input. For example, key inputs from a 12-key mobile telephone keyboard can be analyzed using the T9 algorithm to identify possible input sequences from permutations of multitap input keys. The text engine may be remote from the device; for instance, the device may provide a call to a web service or other functionality provided by a second device in order to obtain the text entry suggestion.

In one illustrative embodiment, the keys are mapped as shown in FIG. 1 (i.e., no mapping for the "1" key, the letters "ABC" mapped to the "2" key, the letters "DEF" mapped to the "3" key, and so on). If the input is "228," then possible permutations include (but are not limited to) "AAT," "BAT"; "BAU"; "BAV" and "CAT." Based on a dictionary of potential words and statistical data, indicating frequency of usage of prior words, the algorithm may determine that "CAT" is the most-frequently used word based on that input, followed by "BAT." These may be suggested, followed by "AAT" and "BAU." Alternatively, the latter words may not be suggested at all in the absence of an entry in the dictionary and/or past use. Other key mappings can be used, and the key mapping may depend on the text engine used for a particular device.

In one embodiment, the text entry suggestion is provided for entry of a new word. For example, previously-entered words (if any) may be evaluated by the text engine in terms of the grammatical and/or subject-matter context to determine likely words for completing an expression. For instance, if the user has entered "send," then the text engine may determine that a likely next word will comprise "to." The word "to" may be offered as a suggested entry even before further input is provided. In some embodiments, a plurality of potential words for entry may be offered in an interface, such as a plurality of onscreen keys for selecting from the potential words.

Block 306 represents determining a confidence level associated with one or more of the text entry suggestions. For example, analysis based on the dictionary and frequency of usage can be used to arrive at a probability value between 0 and 1 for each suggestion to be provided. As another example, the text engine may be configured to tag each suggestion with a confidence identifier (e.g., "low," "medium", or "high") during analysis of the input.

At block 308, one or more haptic effects are identified from a plurality of potential haptic effects. For example, a library of haptic effects may be accessed and one or more effects selected based on the probability value or other indicator of confidence level for a particular text entry suggestion.

Different haptic effects can be identified in different scenarios. For example, in some embodiments, a haptic effect is identified for each of a plurality of text entry suggestions. Then, as a selected one of the text entry suggestions is displayed, selected, or used, its corresponding haptic effect can be provided. As another example, a haptic effect may be identified for a single text entry suggestion, such as the suggestion with the highest confidence level. The haptic effect can be provided when the text entry suggestion is displayed and/or after the text entry suggestion is selected or automatically inserted.

As a further example, a single haptic effect can be selected based on evaluating the confidence levels of the text entry suggestions in aggregate. For instance, a plurality of text entry suggestions may be provided for display to the user. The confidence level of each suggestion can be used as an input in an algorithm to obtain an average, median, or other aggregate confidence value. Then, a single haptic effect can be identified using the aggregate value.

For example, the single haptic effect may be provided when the input interface is displayed. This may alert a user to pay closer attention when confidence levels for all available suggestions are low. On the other hand, if the confidence levels are high, a different, less "jarring" haptic effect may be displayed and the user may simply continue typing, with the suggestion with the highest confidence level selected or inserted by default.

Block 310 represents outputting at least one haptic signal to cause one or more actuators to generate the selected haptic effect(s). For example, definition data for the haptic signal can be accessed and used to drive the actuator(s) in conjunction with output of one or text entry suggestions.

As another example, an actuator may be configured to provide one or more haptic effects in response to a selection signal by generating its own drive signal, such as by maintaining an onboard memory of different haptic outputs. This may be the case when an actuator is comprised in a separate device in communication with the processor, for instance.

Accordingly, the haptic signal can comprise data identifying the selected haptic effect and can be sent to the actuator along with a trigger identifying when to begin the selected effect.

The haptic effect can be provided at any suitable time. For example, as noted above, a haptic effect may be provided when a text entry suggestion is displayed, selected, and/or inserted in some embodiments. In certain embodiments, a first haptic effect is provided when an interface for choosing a suggestion is displayed and then a haptic effect for each respective text entry suggestion within the input interface is provided upon selection of the text entry suggestion. In some embodiments, entire words are mapped to real or screen-based keys. The confidence level associated with each suggested word can be used as the basis of a haptic effect played when the key is selected. This may, for example, allow a user to "feel" the confidence level for each word by touching the respective keys before making a final selection.

In some of the examples above, haptic effects were provided based on a confidence level from a text completion/suggestion engine based on partial or complete text input as analyzed by a predictive text engine. However, aspects of the present subject matter are applicable to other serialized input. Generally, serialized input can be analyzed by an engine or algorithm that provides a plurality of entry suggestions for competing or replacing a unit of the serialized input. One or more haptic effects can be identified and provided in conjunction with display, selection, or use of one or more of the entry suggestions to aid the use of the engine or algorithm.

Figure 4:
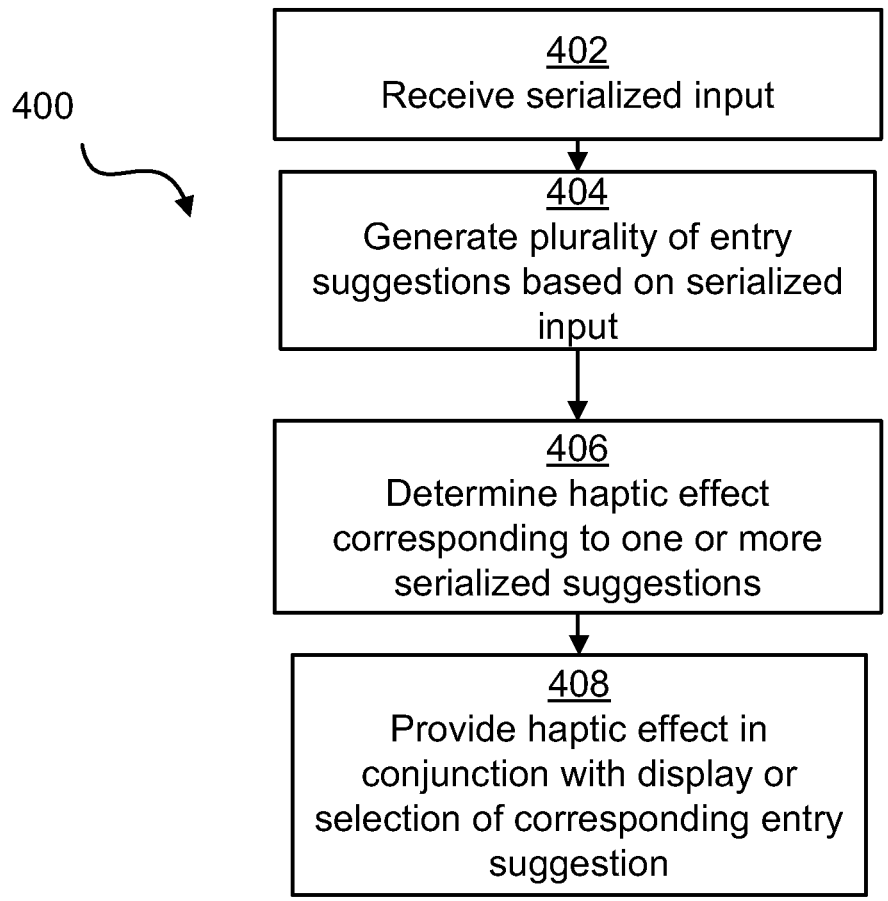
FIG. 4 is a flowchart showing illustrative steps in a method for providing haptic effects in conjunction with output of one or more text entry suggestions.

FIG. 4 is a flowchart showing illustrative steps in a method 400 for providing haptic effects in conjunction with output of one or more suggestions for replacement of a unit of serialized input. Block 402 represents receiving serialized input, such as keyed input data representing a series of characters, words, or phrases. Based on the input, at block 404 a plurality of entry suggestions are generated for replacing one or more intended units within the serialized input. Entry suggestions can include, but are not limited to, text entry suggestions. In such a case, a unit of the serialized input can comprise a word or phrase.

At block 406 of this example, a corresponding haptic effect is determined for one or more of entry suggestions. As was noted above, a haptic effect can be selected in some embodiments based on a confidence level associated with one or more text entry suggestions as determined by a predictive text engine. As another example, a haptic effect can be selected based on the number of available suggestions. For instance, if no entry suggestions are provided or available, a corresponding haptic effect may be selected. A different haptic effect may indicate a large number of selections.

At block 408, one or more haptic effects are provided in conjunction with the display, selection, or other use of one or more of the entry suggestions. Additionally or alternatively, a haptic effect can be provided alongside other output indicating the results of the suggestion process.

In some embodiments, a plurality of entry suggestions may be displayed in sequence with the respective haptic effect for each suggestion provided when the respective suggestion is displayed. As another example, a computing system can comprise a plurality of input keys, with at least some of the plurality of suggestions displayed simultaneously but at positions mapped to respective input keys. The haptic effect for each respective suggestion can be provided when the respective input key is actuated. A "key" may comprise a physical key or button or may comprise an area (e.g., a button) in a graphical user interface. The key can be actuated when it is pressed, touched, or clicked on/hovered over in a graphical user interface.

As noted above, aspects of the present subject matter can be used in the context of any serialized input in which entry suggestions for replacing one or more units of the serialized input are provided.

For example, handwritten characters or gestures made using a pointing device or motion-sensing device can be the source of serialized input. A handwriting recognition or gesture recognition engine can be used to recognize and provide entry suggestions. The engine can provide a confidence level or other indicator of the perceived accuracy of the recognition, which can be used to identify one or more haptic effects to communicate the confidence level to the user.

As another example, a text recognition engine (e.g., optical character recognition (OCR)) or speech recognition engine may be used to obtain and serialized input, with haptic effects provided in the context of confirming the text or speech recognition on a letter-by-letter, word-by-word, phrase-by-phrase, or other basis. For instance, the haptic effects may be provided via a keyboard or mouse interfaced to a computer system verifying the OCR process in a word processing or other application.

The serialized input may comprise one or more data files comprising text that is being edited in a word processing application, integrated development environment (IDE), or other application. For example, a spell checker, grammar checker, or code syntax analysis module may analyze words or phrases of a text and provide one or more text entry suggestions for selection by a user. Haptic effects can be provided to indicate the confidence level of the suggestions individually and/or in aggregate as noted above.

Several examples above refer to haptic effects. Haptic effects can include, but are not limited to, tactile feedback such as vibration of a device. Haptic effects can include or may be provided alongside changes in the appearance of a display (e.g., different colors), sounds, or other types of feedback. Additionally, in several of the examples above, entry suggestions, such as text entry suggestions, were displayed while haptic effects were provided. Additionally or alternatively, entry suggestions may be presented to a user via an audio interface.

Embodiments configured in accordance with the present subject matter can offer advantages in some situations. For example, a user's experience with a device may be enhanced by a reduction of errors in auto-completed text—low-probability matches may be called to the user's attention before the wrong word is used, for instance. Text completion speed may be increased as well. For instance, different types of feedback may allow a user to type without referring to a display except if a low-probability match or other problem is indicated, which can allow for a more compelling user experience.

Figure 5:
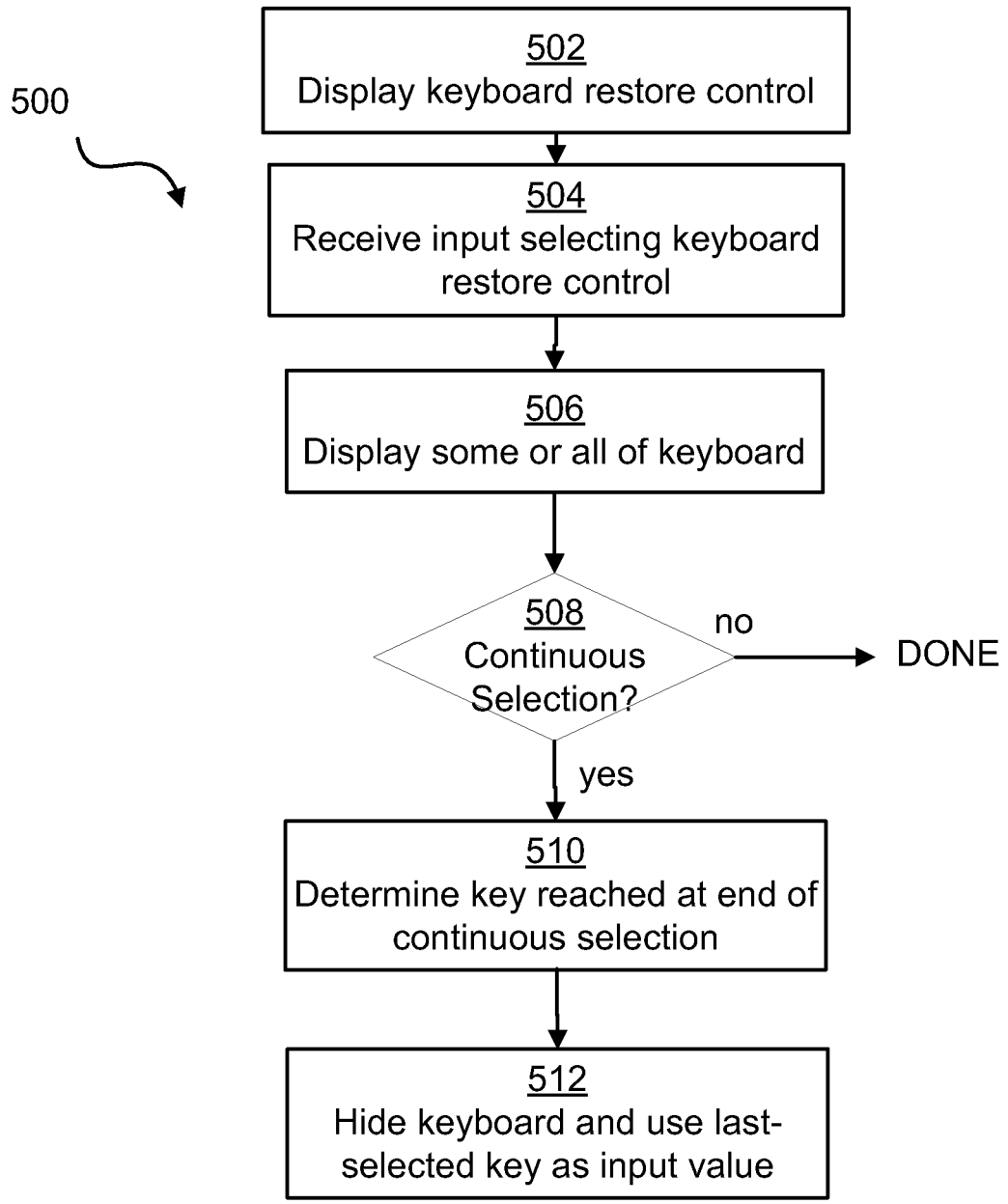
FIG. 5 is a flowchart showing illustrative steps in a method for a dynamic key or text input interface.

As was mentioned above, embodiments can be used alongside any suitable user interface. A user interface can include, but is not limited to, a dynamic key or text input interface presented on a touch-enabled surface. FIG. 5 is a flowchart showing illustrative steps in a method 500 for a dynamic key or text input interface. For example, a user interface module such as modules 118/218 discussed above may be configured to provide an embodiment in accordance with FIG. 5 to allow for selection of characters, phrases and/or words for input via a touch-enabled display or surface.

Turning to FIG. 5, block 502 represents displaying a keyboard restore control. For example, in some embodiments, a dynamic key or text input interface can include a keyboard selectively hidden from view in order to reduce the display area occupied by input elements. This may be particularly advantageous for small screen sizes, but can also enhance use of a screen of any size. In place of the keyboard, a device may feature one or more other input mechanisms. For example, one or more rows of buttons may be displayed, with the buttons used to provide input representing entire words or phrases. Thus, at block 502 a keyboard restore control or tab is displayed to allow the keyboard to be requested for use in providing input as needed. In some embodiments, the keyboard restore control is rendered as a tab or other interface element at an edge of the display area and can be used to "pull" the keyboard back onto the display.

Block 504 represents receiving input selecting the restore control. For example, in a touch-enabled display, coordinates for a tab may be mapped to an area within the display area; when that area is touched, then the tab can be considered to be "selected." Block 506 represents displaying some or all of the keyboard in response. If the keyboard restore control is represented as a tab or other element, the input selecting the restore control may further include dragging the keyboard into view. However, in some embodiments, the keyboard automatically appears after the restore control is touched. One or more visual and/or haptic effects can be played back when the keyboard is displayed.

If other on-screen elements are displayed while the keyboard is hidden, the currently-displayed elements may be supplemented or replaced by the keyboard. As an example, if four rows of word entry keys are displayed when the keyboard is hidden, then when the keyboard is displayed, only a single row of word entry keys (or no word entry keys) may be displayed.

Block 508 represents determining if the selection is continuous—i.e. determining if there is any discontinuity in selection of the keyboard restore control or keyboard. In some embodiments, a continuous or near-continuous selection of the keyboard restore control followed by a dragging motion across the keyboard is handled differently than discontinuous selection of the keyboard restore control and then selection of one or more keys. This may be achieved, for example, by determining if there are any breaks in contact with the touch surface in the time period between selection of the keyboard restore control and a key on the keyboard and evaluating the length of any such breaks. For instance, a timing threshold value may be consulted to determine if a gap in contact/selection of the restore control and one or more keys is sufficiently long to determine whether selection is "continuous."

In this example, if selection is not continued, then at block 508 the dynamic subroutine ends and the keyboard is displayed until hidden again in response to user input; additionally or alternatively the keyboard may be re-hidden after a predetermined length of time has elapsed.

On the other hand, if selection is continuous, then block 510 is reached. Block 510 represents displaying the keyboard until the selection ends and determining which key was reached at the time of discontinuity. For example, a user may touch the keyboard restore control to pull out the keyboard and then drag a finger, stylus, or other object across the keyboard until a desired key is reached. The selection can be considered to end when the user stops touching the keyboard or if the user lingers at a particular key for a threshold length of time.

In some embodiments, one or more haptic effects are provided in conjunction with use of the dynamic key or text input interface. For example, different haptic effects can be played back when selection of the keyboard restore control occurs, when the keyboard is displayed, when different keys are encountered, to simulate gaps between keys, and/or to simulate other effects.

Block 512 represents hiding the keyboard and using the last-selected key as an input value. For example, if the user pulls out the keyboard, drags a finger across to the "R" key, and then stops dragging (and/or stops touching the keyboard), the "R" key can be considered to be the desired input. Data identifying the "R" key can be stored in memory for use by another component.

In some embodiments, the last-selected key can be used by a text engine as an input value to update a set of suggested words. For example, as was noted above, one or more buttons can be presented for selection of text entries comprising entire words. If a desired word is not displayed amongst the available candidates, a user can drag the keyboard into view and provide one or more letters. The provided letter(s) can be used to generate a new collection of candidate words and buttons with the updated collection of candidate words can be displayed when the keyboard is hidden.

The dynamic key or text input interface can be used independently of haptic effects based on confidence levels in some embodiments. However, other embodiments incorporate the use of haptic effects to indicate confidence levels for the candidate words in accordance with the examples noted above in FIGS. 1-4.

Figure 6C:
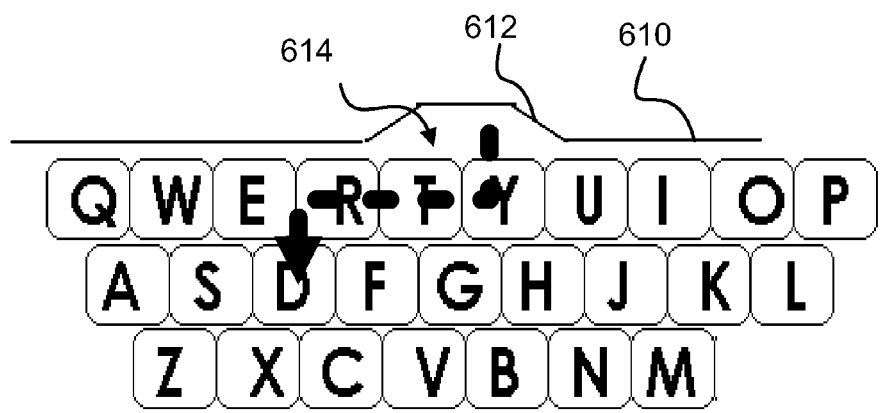

FIGS. 6A-6D are each a diagram showing aspects of an illustrative dynamic key or text input interface in use. FIG. 6A represents an initial view of a device 600 providing an interface 602. In this example, a display area 604 is provided and may, for example, allow a user to compose an e-mail, SMS, blog posting, document, command, or to otherwise provide input that includes textual content. Other content such as web pages, previous email messages, and the like may be viewed in display area 604.

An input area 606 is shown in the lower half of interface 602 in this example for receiving user input. Particularly, a plurality of keys 608 allow for selection of entire words or phrases for entry, while a keyboard 610 comprises an arrangement of keys for selection of one letter/character at a time for entry. The whole-word selection keys may allow for selection of single letters (such as "I" shown in FIG. 6A) when the text engine indicates a single-letter "word." The particular layout and composition of the keyboard is for example only; other layouts can include more or fewer letters, punctuation, symbols, numbers, function keys (e.g., shift), and the like.

In this example, no text has yet been entered and so no text is shown in display area 604. For example, the user may have just begun composing a message. A text engine has determined a plurality of candidate suggestions, three of which ("I", "Ok", and "Do") are shown in FIG. 6A as options that can be selected using corresponding whole-word selection keys 608. In this example, keyboard 610 can be minimized so that input area 606 can be reduced in size relative to display area 604 and/or so that more keys 606 can be displayed to allow selection of entire words.

FIG. 6B shows interface 602 after keyboard 610 has been minimized. In this example, additional whole-word selection keys 608 with corresponding suggestions ("Where", "Hey", "Why", "am", "What", and "When") are shown. Additionally, a keyboard restore control 612 has been rendered at the bottom of interface 602 to allow a user to request keyboard 610 to be returned for use. In this example, keyboard 610 drops off the bottom of interface 602, but it will be understood that the relative position and arrangement of display area 604, input area 606, and the size, layout, and format for keys 608 and keyboard 610 can vary. When keyboard restore control 612, keyboard 610 can be returned for use by moving upward from the bottom edge of interface 612 as indicated by the upward-pointing arrow.

In this example, single words are suggested. Embodiments include suggestion of multiple words (i.e. phrases) in a single key 608 (e.g., "No Way") and/or inclusion of punctuation or other characters in a suggestion (e.g., "LOL!"). Additionally, the single word suggestions can comprise a single letter or character that also appears on the keyboard. For instance, the letter "A" may be a suggested word. Text entry suggestions can include words, characters, and/or phrases in other languages or alphabets than those shown here, and a mixture of languages/alphabets could be used if supported by the underlying text engine.

FIG. 6C illustrates an exploded view of keyboard 610. A user may desire to use keyboard 610 to enter one or more characters if the available whole-word input keys 608 do not display a desired word. In this example, the user initially selects restore control 612 and drags upward (schematically illustrated by the arrow in FIG. 6B). Then, while keeping a finger, stylus, or other pointer in contact with interface 600 or otherwise maintaining a selection of keyboard 610, the user can drag across keys to a letter of interest as shown by arrow 614 in FIG. 6C. Haptic feedback can be provided during this motion, such as feedback as the user's finger moves from key to key.

In this example, the user drags downward from restore control 612 to the "Y" key and then across the "T" and "R" keys until reaching the "D" key. If the user lingers at "D" key beyond a predetermined threshold or breaks contact with the touch interface at the "D" key, then this action can be interpreted as selection of the "D" key.

Figure 6D:
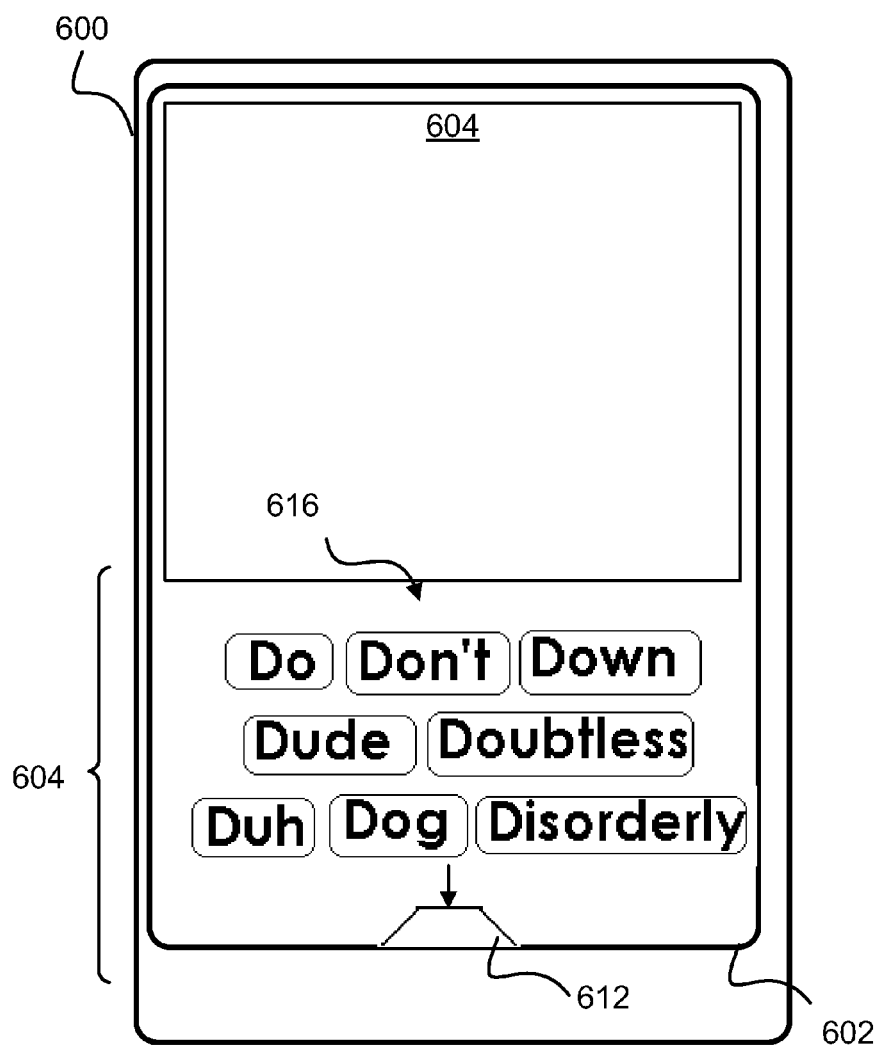

FIG. 6D illustrates a state of interface 600 following selection of the "D" key. Keyboard 610 has again been hidden as indicated by the downward-pointing arrow and restore control 612 is again shown at the edge of interface 612. A plurality of whole-word input keys are shown at 616. However, keys 616 differ from keys 608 in that the set of candidate suggestions has been updated based on input of the "D" key. In this example, all of the suggested words ("Do", "Don't", "Down", "Dude', "Doubtless", "Dog", "Disorderly", "duh") begin with the letter "D." The particular set of candidate suggestions may, of course, depend on the operation of the text engine. For instance, based on past and/or present contextual information, other words starting with "D" or even other letters may be deemed to be the most likely words for entry and can be reflected in the available keys 614. If the text engine supports different languages/character sets, foreign-language words, characters, and phrases can be included in the available keys 614.

Examples were provided above with respect to a touch-enabled interface. However, the dynamic key or text input interface may be provided via a display and input received via another device, such as a mouse or other peripheral. For example, a user may position a pointer on-screen at tab 612, click tab 612, and drag the keyboard on-screen. Then, the user may then move to and hover over a key of interest. Continuous selection of the keyboard may be inferred from a continuous clicking of the pointer and/or may be based on movement of the mouse pointer over the keyboard without lingering until the key of interest is reached.

Figure 7:
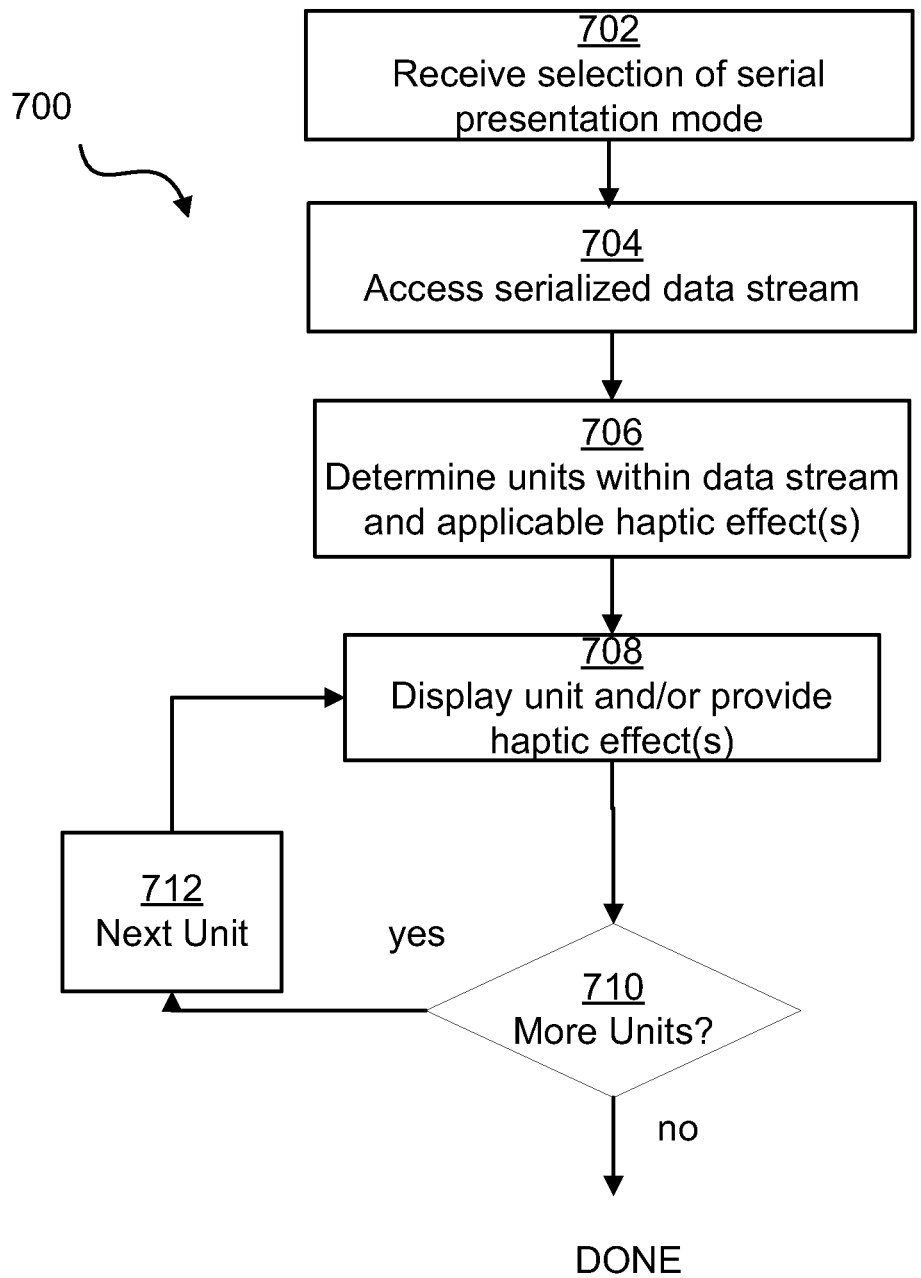
FIG. 7 is a flowchart showing illustrative steps in a method for providing serialized presentation of a message.

FIG. 7 is a flowchart showing illustrative steps in a method 700 for providing serialized presentation of a message. In some embodiments, a device may be configured to operate in a serialized presentation mode where individual units of a message are displayed individually and one after another rather than as a string of text or characters. This may be advantageous when a user cannot pay close attention to a display. Instead of (or in addition to) rendering an entire message at once, the serialized presentation mode can be invoked and individual words (or other units) are then displayed one-by-one. For example, the serialized words (or other units) may be displayed using larger font size than would otherwise be possible if multiple portions of the message were displayed together.

Block 702 represents receiving input selecting use of the serial presentation mode. For example, a mobile or other device may support multiple output modes, with serial presentation mode selected via a menu, input key, or other device control. In some embodiments, serial presentation mode can be selected in response to physics-based input. For instance, a device may include one or more sensors, such as an accelerometer, that detects motion of a device. As an example, a device may be configured to switch into serial presentation mode in response to shaking or tapping of the device.

Block 704 represents accessing a serialized data stream. A serialized data stream can include any communication that can be broken into units for serial output. For instance, the serialized data stream may comprise data representing textual content, such as an e-mail message, an instant message, or a short message service (SMS) message. As another example, the serialized data stream may comprise data representing content of a web page, word processing document, or another document.

Block 706 represents determining units within the data stream and one or more haptic effects for use in outputting data. For example, determining units within the data stream can comprise identifying words, punctuation, and other characters (e.g., icons, smilies) from the syntax of the message—words may be differentiated based on spaces and/or punctuation, for instance. Haptic effects can be determined based on data included in the message, such as information requesting output of a particular haptic effect, data mapping message content to haptic effects, and/or data mapping message activity to particular haptic effects.

As an example, a device may access data mapping particular types of haptic effects to corresponding punctuation marks. As another example, different words can be mapped to different types of haptic effects and/or word characteristics can be used to determine effects to use. For instance, a list of keywords of interest may be consulted and, if a keyword is present in a message, the haptic effect(s) associated with the keyword can be played back when the keyword is displayed. As another example, different haptic effects may be associated with different grammatical portions of the message. For instance, a device may determine one or more subjects, verbs, and objects in a message and play corresponding haptic effects when the word(s) corresponding to the respective subject(s), verb(s), and object(s) are to be serially output.

Additional embodiments may display some, but not all, units of a serialized data stream. For example, the syntax or context of a message may be used to identify unneeded or undesired content, such as email headers, portions of a previous message quoted in a reply, in order to expedite the display process.

Block 708 represents displaying one or more individual units of the data and/or providing a haptic effect or effects. For example, a word may be displayed while a corresponding haptic effect is played back. Additionally or alternatively, haptic effects may be played back before and/or after a word or other unit is displayed. In some instances, a haptic effect may be played in place of a word or other unit. For example, a sharp vibration may be provided instead of displaying an exclamation point or a slow vibration may be played back instead of a comma. Punctuation may also be used in determining the timing the display. For instance, a comma, semicolon, period, or other indicator may introduce delay between display of a first word and one or more subsequent words. These pauses may be associated with haptic effects in some instances.

Blocks 710 and 712 represent a loop proceeding through the serialized data stream. In this example, block 710 represents checking for additional units and block 712 represents moving to the next unit, which is then used as the basis for displayed and/or haptic output until no more units remain.

In this example, process 700 proceeds until no units of data remain. In some embodiments, one or more additional steps are included to base display of serialized data upon user input. For example, the method may not proceed to display additional units until or unless input is received, such as haptic input representing shaking, tapping, or other movement of the device. In some embodiments, moving the device can be interpreted as a command to step forward to the next word, step backward to a previous word, or to pause display of the serialized data.

Figure 8A:
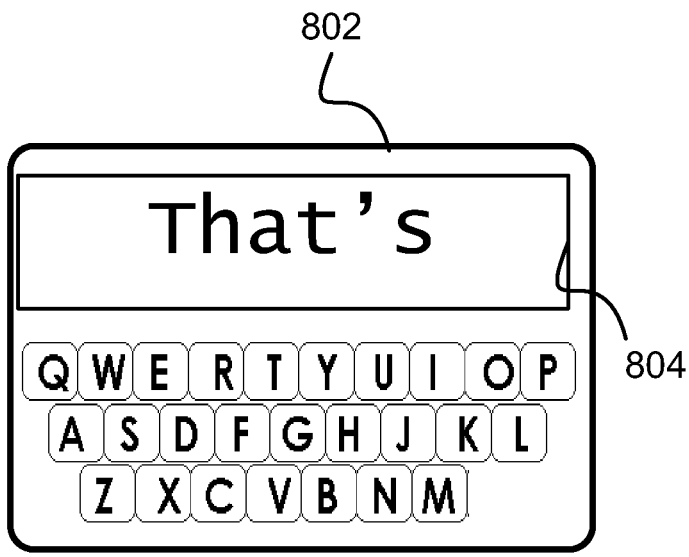
FIGS. 8A and 8B are each a diagram showing illustrative output of a message using serialized presentation.
Figure 8B:
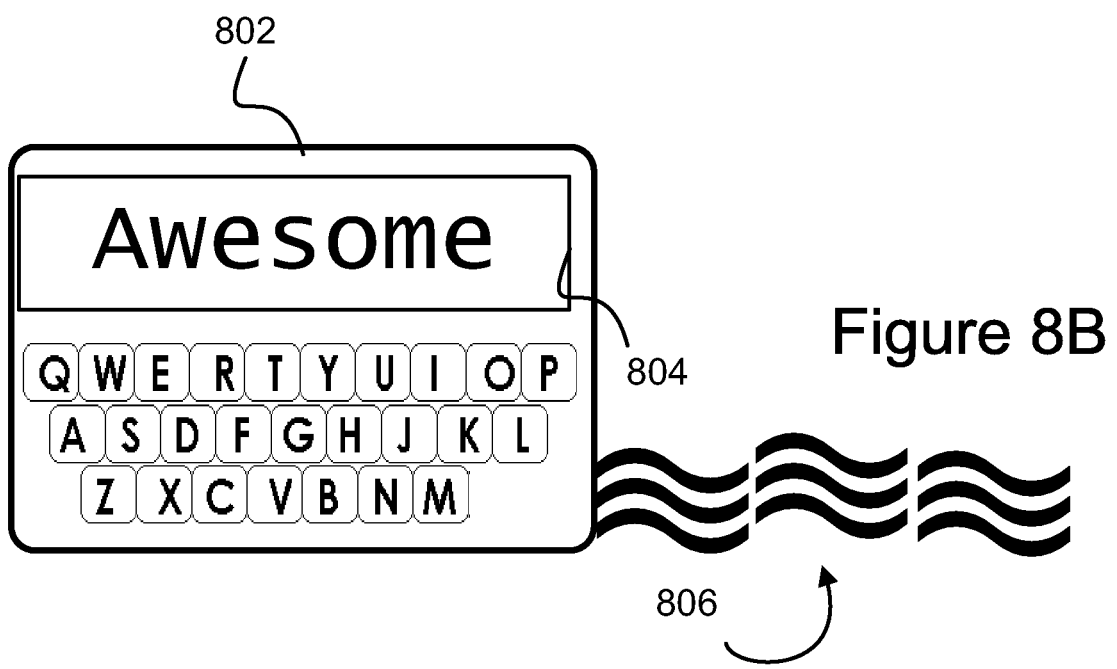

FIGS. 8A and 8B are each a diagram showing illustrative output of a message using serialized presentation. In this example, a user has sent a message comprising the text "That's Awesome!" to a user of device 802. As shown in FIG. 8A, device 802 has received the datastream and determined that the message comprises three textual units: "That's", "Awesome" and "!". In FIG. 8A, the first unit ("That's") has been displayed. FIG. 8B represents display of the second unit ("Awesome") along with a graphical illustration 806 of a haptic effect associated with the exclamation point. In some embodiments, punctuation, such as the exclamation point, is displayed and a haptic effect is provided, although in this example the haptic effect is provided instead of displaying the exclamation point.

Different haptic effects can be provided in order to preserve the overall flow and tone of a message. For example, a series of haptic effects can be determined based on word order and context to determine one or more points of emphasis in a sentence. For instance, if a message indicates an assignment is due "by 2 pm Friday," a haptic effect can be triggered when the due date/time is displayed. As another example, the phonemes of the message can be identified and then mapped to appropriate haptic effects to simulate speech effects. For instance, sharp haptic effects may be mapped to stressed syllables, softer haptic effects can be mapped to unstressed syllables, and/or combinations of haptic effects can be mapped to phonemes. When a word is displayed, the appropriate haptic effects can be played back to simulate the syllables/phoneme effects.

Figure 9:
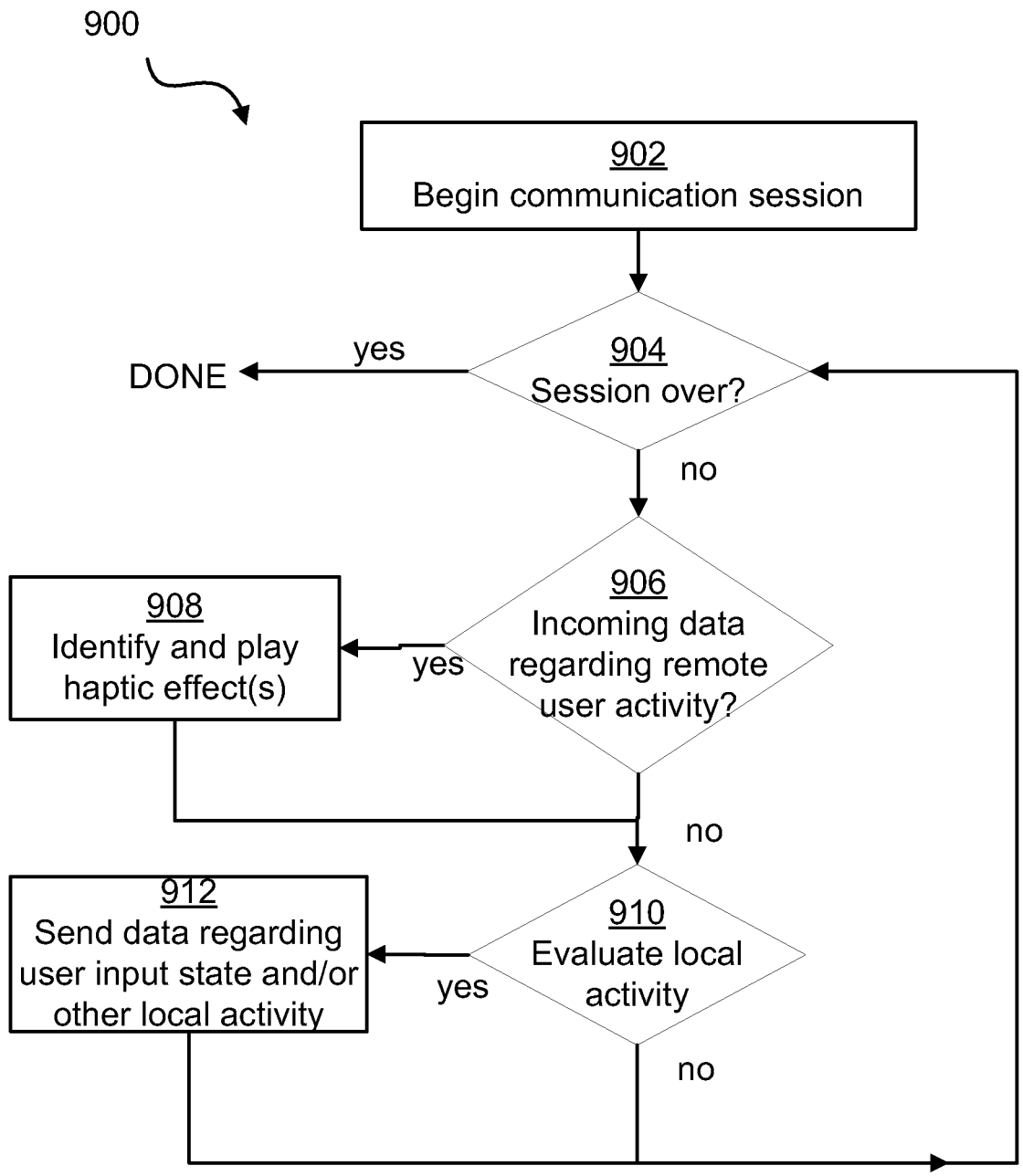
FIG. 9 is a flowchart showing illustrative steps in a method for providing haptic effects while a communications session is in progress between two or more devices.

In some embodiments, a device may provide haptic effects based on input or other activity at one or more other devices. FIG. 9 is a flowchart showing illustrative steps in a method 900 for providing haptic effects while a communications session is in progress between two or more devices. Block 902 represents beginning the communications session. For example, two or more devices may connect to one another via a direct connection using suitable onboard networking technology and/or via a network. As another example, the devices may log into a service provider. For purposes of clarity, the details of setting up and maintaining the underlying connection and relaying messages are not shown, as such details should be within the abilities of one of ordinary skill in the art.

Block 904 represents determining if the session is over; if so, the method is complete. However, in this example, while the session continues, incoming data is evaluated to determine if one or more haptic effects should be played back based on activity by one or more users involved in the communication session. The haptic effect(s) can be provided in addition to haptic effects associated with receipt of the communication and can, for example, allow users to be aware of when other users are inputting data.

Block 906 represents determining if any incoming data has been provided with regard to remote user input or other remote activity. For example, each user involved in the communication session may utilize a client that provides status data indicating whether the user is typing/inputting a message or response for the other user(s) of the session. The incoming data may simply indicate a status (e.g., "typing," "entered text but not sent," etc.) that is mapped to a particular haptic effect. However, the incoming data may comprise more detailed information. For instance, in some embodiments, each time a character or word is selected at a device, the device provides an indicator of the selected character/word for the other user(s) in communication with the device. For example, different indicators may be mapped to corresponding haptic effects for individual letters, punctuation marks, or selection of entire words. In some embodiments, rather than indicators, an originating device sends data specifying a haptic effect. For example, a user typing a message at a device may configure the device to send particular haptic effects as different letters, words, punctuation marks, or other characters are typed.

Another example of remote activity is playback of haptic effects while data is output at the remote device. For instance, the remote device may be operating in a serialized output mode such as discussed above in conjunction with FIG. 7 or in another mode in which haptic effects are provided when words, characters, or other content is displayed. Data indicating this display activity may be provided so that the local device feels a corresponding haptic effect, such as an "echo" of the playback of the haptic effect at the remote device.

At block 908, the haptic effects are identified and played back at the device based on the data from the remote user activity. For instance, if a haptic effect is explicitly identified, suitable signals can be generated and used to drive one or more actuators. If the data regarding the remote input activity does not specify a haptic effect, then the data can be cross-referenced to haptic effects for playback based on consulting data in memory mapping remote activity to haptic effects.

Block 910 represents evaluating input and other activity at the device. If so, then at block 912, data is sent regarding the user input state. For instance, if a user types a character or a word, appropriate data identifying that the user is typing and/or what has been typed can be sent. If a haptic effect is to be specified, then data identifying the haptic effect can be sent. If haptic effects are provided in conjunction with output of content received from remote devices, data indicating playback of the haptic effect can be provided to the remote device(s) so that an "echo" or other indicator can be provided at the remote device(s).

Some embodiments combine aspects of the embodiments noted above. As an example, a computing system can comprise an actuator, a display, a sensor, and a processor with access to a computer-readable medium embodying program components. The computing system may comprise a mobile device, a computer, or two or more mobile devices, computers, or other systems in communication with one another.

The program components can include a user interface module that configures the system to receive input data representing a series of characters, words, or phrases. The input data may be received using a dynamic key or text input interface rendered on the display device, with the dynamic key or text input interface configured to selectively display an onscreen keyboard in response to selection of a keyboard restore control and to hide the keyboard after determining selection of a single key. The user interface module may also configure the system to display units of the serialized data stream individually and in sequence in response to selection of a serialized display mode. Selection of the serialized data mode can be determined based on motion detected by the sensor—if the computing system comprises a mobile device, the motion may comprise shaking of the device or a peripheral.

The program components can include a text engine configured to generate a plurality of text entry suggestions based on the received input data and determine a confidence level associated with each text entry suggestion. For example, the text entry suggestions may comprise one or more words or phrases presented in word selection buttons of the dynamic key/text input interfaces. Additionally or alternatively, the text entry suggestions can include automatic or suggested corrections of entered text and/or completions of partially-entered text.

The program components can include a haptic effect module configured to identify a haptic effect from a plurality of potential haptic effects based at least in part on the confidence levels and output at least one haptic signal configured to cause the actuator to generate the identified haptic effect. For instance, different haptic effects may be played back when text entry suggestions are selected or displayed and additional haptic effects may be played back when a text entry suggestion is used to replace previously-entered (or partially-entered) text. Still further haptic effects may be played back when the keyboard is restored, hidden, or used.

The program components can also include one or more communication applications such as an email application, messaging application, browser, or the like that configures the system to access a serialized data stream and status information indicating activity by a remote user or data source. The application may, for example, indicate when or what a remote user is typing, viewing, and/or when a haptic effect is provided to the remote user. This information may be used by the haptic effect module to provide a haptic effect in response to the status information.

General Considerations

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a predictive text algorithm or other input recognition engine.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, ail electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

Some embodiments may be computationally-intensive. The problem of ensuring adequate performance of a computationally-intensive application is conventionally addressed in a number of ways, such as by utilizing more powerful processors and larger memories. Other approaches for addressing these needs include allocating some processing tasks at a device while relying on a server for other tasks. For example, a mobile device may handle processing tasks for generating a user interface and receiving input but provide calls to a text engine at a remote server or other device accessible over a network connection. As another example, the remote server or other device may be used to determine appropriate haptic effects.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising:
   receiving, at a computing device, input data representing a series of input selections, the input selections comprising characters, words, or phrases;
   ascertaining, by the computing device, at least one text entry suggestion generated based on the received input data;
   determining, by the computing device, a confidence level associated with each text entry suggestion;
   identifying, by the computing device, a haptic effect from a plurality of potential haptic effects based at least in part on the confidence level; and
   outputting, by the computing device, at least one haptic signal configured to cause an actuator to generate the identified haptic effect.

2. The method set forth in claim 1, wherein the text entry suggestion comprises at least one of a completion suggestion based on the received input data or a correction suggestion based on the received input data.

3. The method set forth in claim 1, wherein the confidence level is based on a probability value and identifying comprises:
  identifying the haptic effect from a function correlating probability values to the plurality of potential haptic effects.

4. The method set forth in claim 1, further comprising:
  providing an interface, the interface configured to present a plurality of text entry suggestions and receive a selection of one of the plurality of text entry suggestions; and
  wherein identifying the haptic effect comprises identifying the haptic effect associated with the selected one of the plurality of text entry suggestions.

5. The method set forth in claim 1,
  wherein generating comprises generating a plurality of text entry suggestions;
  wherein determining comprises determining a confidence level associated with each of the text entry suggestions; and
  wherein identifying comprises identifying a haptic effect for each of the text entry suggestions.

6. The method set forth in claim 5, further comprising providing a display signal to display each of the text entry suggestions in sequence, wherein outputting at least one haptic signal comprises outputting a signal to generate the haptic effect corresponding to each text entry suggestion while the text entry suggestion is displayed.

7. The method set forth in claim 1,
  wherein generating comprises generating a plurality of text entry suggestions;
  wherein determining comprises determining a confidence level associated with each of the text entry suggestions; and
  wherein identifying comprises identifying a single haptic effect based on evaluating the confidence levels of the text entry suggestions in aggregate.

8. The method set forth in claim 1, further comprising receiving input selecting the text entry suggestion for use as an input value;
  wherein outputting occurs after the text entry suggestion has been selected for use as an input value.

9. A system comprising a processor with access to a computer-readable medium embodying program components and an actuator, the program components comprising:
  a user interface module configured to receive input data representing a series of characters, words, or phrases;
  a text engine configured to generate a text entry suggestion based on the received input data and determine a confidence level associated with the text entry suggestion; and
  a haptic effect module configured to identify a haptic effect from a plurality of potential haptic effects based at least in part on the confidence level and output at least one haptic signal configured to cause the actuator to generate the identified haptic effect.

10. The system set forth in claim 9, wherein the confidence level is based on a probability value and the haptic effect module is configured to identify the haptic effect from a function correlating probability values to the plurality of potential haptic effects.

11. The system set forth in claim 9, further comprising a display,
  wherein the user interface module is configured to present a plurality of text entry suggestions on the display and to receive a selection of one of the plurality of text entry suggestions; and
  wherein the haptic effect module is configured to identify the haptic effect associated with the selected one of the plurality of text entry suggestions.

12. The system set forth in claim 9,
  wherein generating comprises generating a plurality of text entry suggestions;
  wherein determining comprises determining a confidence level associated with each of the text entry suggestions; and
  identifying comprises identifying a single haptic effect based on evaluating the confidence levels of the text entry suggestions in aggregate.

13. The system set forth in claim 9,
  wherein the haptic effect module is configured to output the at least one haptic signal after the user interface module has received selection of a text entry suggestion for use as an input value.

14. The system set forth in claim 9, wherein the processor, actuator, and computer-readable medium are comprised in a system comprising at least one of a mobile telephone, personal digital assistant, or a computer.

15. The system set forth in claim 9, wherein the processor and actuator are comprised in separate devices in communication with one another.

16. A tangible non-transitory computer-readable medium embodying program code executable by a computing system, the program code comprising:
  program code for receiving serialized input;
  program code for generating an entry suggestion to replace a unit of the serialized input based on the received input data;
  program code for determining a confidence level associated with the entry suggestion; and
  program code for identifying a haptic effect from a plurality of potential haptic effects based at least in part on the confidence level.

17. The computer-readable medium set forth in claim 16, wherein the serialized input comprises input data representing a series of characters, words, or phrases and the entry suggestion comprises a text entry suggestion.

18. The computer readable medium set forth in claim 17, further comprising program code for causing the computing system to output at least one haptic signal configured to cause an actuator to generate the identified haptic effect.

19. The computer-readable medium set forth in claim 18, wherein the confidence level comprises a probability value and identifying comprises identifying the haptic effect from a function correlating probability values to the plurality of potential haptic effects.

20. The computer-readable medium set forth in claim 18, further comprising program code for providing an interface, the interface configured to present a plurality of text entry suggestions and receive a selection of one of the plurality of text entry suggestions,
  wherein identifying the haptic effect comprises identifying the haptic effect associated with the selected one of the plurality of text entry suggestions.

21. The computer-readable medium set forth in claim 18,
  wherein generating comprises generating a plurality of text entry suggestions;
  wherein determining comprises determining a confidence level associated with each of the text entry suggestions; and
  wherein identifying comprises identifying a haptic effect for each of the text entry suggestions.

22. The computer-readable medium set forth in claim 18,
wherein generating comprises generating a plurality of text entry suggestions;
wherein determining comprises determining a confidence level associated with each of the text entry suggestions; and
wherein identifying comprises identifying a single haptic effect based on evaluating the confidence levels of the text entry suggestions in aggregate.

23. The computer-readable medium set forth in claim 18, further comprising program code for receiving input selecting the text entry suggestion for use as an input value, wherein outputting occurs after the text entry suggestion has been selected for use as an input value.

\* \* \* \* \*